Aug. 1, 1961      E. E. HARDY      2,994,110

SURFACING PROCESS FOR ISOCYANATE FOAM AND PRODUCT

Filed May 10, 1957

INVENTOR:
EDGAR E. HARDY

By Clell W. Upchurch
ATTORNEY.

2,994,110
SURFACING PROCESS FOR ISOCYANATE FOAM AND PRODUCT

Edgar E. Hardy, New Martinsville, W. Va., assignor to Mobay Chemical Company, St. Louis, Mo., a corporation of Delaware
Filed May 10, 1957, Ser. No. 658,271
14 Claims. (Cl. 18—59)

This invention relates generally to foams and more particularly to a method for densifying the surface of isocyanate foams and to the resulting product. The invention is especially concerned with an improved method for forming a substantially continuous dense skin on isocyanate foams.

The characteristics of isocyanate foams are such that they can be utilized to advantage for forming a variety of articles including, for example, cushions; toys; various parts for vehicles including arm rests, wind lacing, seat cushions, and side panels; shoulder pads and insulation for various kinds of garments; various components of aircraft, including radomes; sound and heat insulating wall panels; and the like. The porous surface of the isocyanate foams is less desirable, however, than a smooth continuous surface for many of these articles. Consequently, it has been proposed to coat the foam with an adherent film of another synthetic resin or with a film of polyurethane applied from a polyurethane coating composition. The application of a coating of a synthetic resin from a solution or emulsion is disadvantageous, however, because it is time-consuming and introduces other inconveniences in the manufacturing of articles from foam. For example, more than one type of resin must be utilized. Moreover, the surface obtained by the coating process is not entirely satisfactory because the pores in the foam are not always effectively hidden and the resulting surface is unattractive and commercially undesirable.

It is therefore an object of this invention to provide a method for providing a polyurethane foam with a substantially dense surface that is devoid of the foregoing disadvantages. Another object of the invention is to provide an improved method for forming a dense skin on polyurethane foam. A further object of the invention is to provide a method for making shaped articles of polyurethane foam having a dense reinforced surface that has improved abrasion and scratch resistance. A still further object of the invention is to provide a novel and improved method for providing polyurethane foam with a decorative and protective coating. Still another object of the invention is to provide a means for converting otherwise scrap polyurethane foam into merchandisable articles. A still further and more specific object of the invention is to provide a method for utilizing polyurethane foam that would otherwise be scrap material with little commercial value.

Other objects will become apparent from the following description and accompanying drawing in which FIGURE 1 is a cross sectional view of apparatus suitable for one embodiment of the invention;

Figure 1:
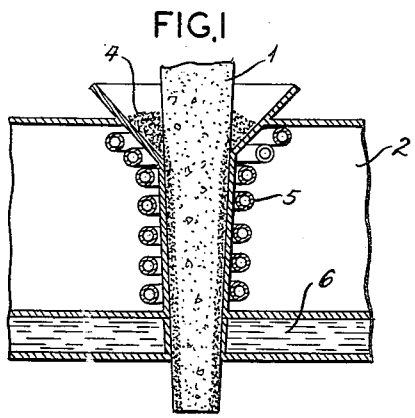

In my copending application, Serial No. 588,053, filed May 29, 1956, of which this application is a continuation in part, I have disclosed a method for forming a dense continuous surface on porous polyurethane foam by heating the foam to a temperature where at least some plastic flow is obtained but at a temperature below the point where any appreciable decomposition of the polyurethane foam will occur and applying sufficient pressure to the heated surface to consolidate the surface into a substantially dense skin. In accordance with the process disclosed in my aforesaid application, the skin is formed on the surface of the polyurethane foam by consuming at least that portion of the foam exposed at the surface.

Generally speaking, the objects of this invention are accomplished by providing a process for densifying the surface of a polyurethane foam structure which involves fusing a stratum of polyurethane foam to the foam surface to be densified. It has now been found that a dense, integral skin can be formed on the surface of a basic polyurethane foam structure without consuming any substantial amount of the polyurethane foam structure by applying additional polyurethane foam to the surface and then heating and pressing at least the applied foam. The applied foam adheres to the substratum and indeed becomes integral therewith, forming a unitary structure having a dense skin substantially impervious to fluids. The densification of the surface is accomplished by applying the polyurethane foam on the surface of a shaped polyurethane foam structure and then heating at least the applied foam to a temperature where some plastic flow is achieved but to a temperature where no substantial amount of chemical decomposition occurs. At least some pressure must be applied to consolidate at least the incipient melting applied foam in the pores of the underlying foam, while at an elevated temperature where some plastic flow of at least the applied foam will occur. Both the polyurethane foam to be surfaced and the polyurethane used for forming the surface are cured polyurethane foams or, in other words, foam that has had time to set or reach its maximum volume after the original production thereof so that it is self-supporting and may be handled and readily subjected to further shaping operations, such as cutting, sawing, bending, and the like. By forming the skin from foam applied to the surface of the basic structure instead of only consuming the surface of the basic structure, control of the dimensions of the finished product is facilitated. Best results are obtained if both the applied foam and the surface of the structure to be coated are heated to the fusion point. Any dimension lost from fusing the surface of the structure to be coated may be compensated for by using sufficient applied foam to produce the desired dimension in the coated product.

The stratum of polyurethane foam that is fused into a dense skin on the polyurethane foam structure may be of any suitable shape and size. For example, it may be a relatively thin sheet that completely or only partially covers at least one surface of the foam to be surfaced or it may be particles or fragments of polyurethane foam. The particles of foam may be shreds or chunks or the foam may be in the form of finely granulated material such as is obtained by grinding or milling polyurethane foam. Indeed, one of the most significant advantages of the invention is that it provides a method for utilizing pieces of polyurethane foam of practically any shape and thus provides a means for utilizing polyurethane foam that would otherwise have little or no commercial application or value. The stratum of applied foam may be a sheet that has been prepared by fusing particles of foam into a continuous sheet or web.

The polyurethane foam from which skin is formed may have the same characteristics and chemical composition as the polyurethane foam that will later be the substratum of the finished article or it may have a different chemical composition and have different characteristics. Moreover, the skin may be formed from more than one kind of polyurethane foam. Foams of various composition and characteristics may be blended together for use as the densifying stratum or foams of different kinds may be arranged on the surface of the foam to be densified in order to provide a surface of heterogeneous composition and characteristics having predetermined areas of each composition and characteristic.

For convenience, the term "stratum" is utilized herein and in the appended claims to describe the foam applied to the surface of the basic structure and is intended to be inclusive of fragments, sheets, finely ground particles and other forms of polyurethane foam suitable for forming a skin on the basic structure. The term "substratum" is used herein and in the appended claims to define the foam structure to be coated.

In applying the substantially dense and substantially impervious skin to the cured polyurethane foams, temperatures from as low as about 120° C. to as high as about 1,000° C. may be utilized, but seldom will temperatures substantially more than 500° C. be required. Best results are usually obtained with polyester foams at temperatures varying from about 150° C. to about 480° C. and for this reason this temperature range is preferred. If the foam has been prepared from a polyalkylene ether glycol and a polyisocyanate, it is preferred to fuse the applied foam and the surface of the substratum by heating to a temperature of not more than about 480° C. However, the temperature that will give best results in a particular instance will, of course, vary somewhat with the chemical composition of the foam used, the method employed for forming the skin, the dimensions of pieces of foam to be converted into the skin, and the desired skin thickness.

The heated metal surface that contacts the foam is preferably heated to a temperature which is at least slightly higher than, but which may be considerably higher than, the temperature to which the polyurethane foam surface itself is to be raised. For example, in order to produce effective dense skin-forming temperatures within the range of (say) 320° to 400° C. at the interface between the heated metal surface and the polyurethane foam surface, it will generally be necessary to heat the metal surface, such as the walls of the mold or press or die or the periphery of the roller or wheels, to temperatures ranging from 400° to 500° C. because of the relatively short dwell time of the polyurethane foam within the actual heating zone. If the surface coating is applied while using a knife blade, the temperature of the blade should be about 100° C. higher than the foam. For example, the temperature of the blade should be about 450° if the temperature of the foam is to be about 350° C.

The time required to consolidate properly the polyurethane foam into a dense skin will vary from about 0.1 second to a much longer time of as much as 5 minutes in some processes but good results are usually obtained in most instances when the temperature of the polyurethane foam is held at the desired temperature for from about 5 to about 180 seconds. In most embodiments, a period of from about 10 to about 20 seconds is sufficient time to produce a skin having the best density, adhesion, pliability and other properties and, for this reason, this treatment time is preferred.

In the knife coating process where the foam or knife is moved with respect to the other, a rate of from about one foot to about 35 feet per minute may be used when the temperature of the knife is about 100° C. higher than that required to properly fuse the foam.

Only sufficient pressure to consolidate the applied foam against the substratum need be used. The pressure required to properly consolidate the applied foam into a suitable skin on the basic foam structure will vary depending upon the nature of the foam, the type of pressure applied, and the thickness of the applied foam layer. However, in most instances, good results are obtained with an applied pressure within the range of from about 0.2 pounds per square inch (p.s.i.) and 1,000 p.s.i. Best results are obtained when the pressure is maintained at from about 10 p.s.i. to about 200 p.s.i. so this pressure range is preferred.

It is more difficult to apply the skin to the substratum with rollers but under properly controlled conditions a satisfactory skin can be obtained.

When the skin is formed on the basic structure by passing it between pairs of heated pressure rollers, the applied pressure may be expressed in terms of the percentage of compression of the basic structure as it passes through the nip of the rolls. Compression of the basic structure may be such that while under compression it has a volume of from about 50 to about 99% of its uncompressed volume, but it is preferred to compress the basic structure to the point where its volume is from about 95 to about 98% of its uncompressed volume. It may be necessary to heat the foam by means in addition to the heated rollers in some instances to insure proper fusion. When operating under such conditions, the linear speed of the basic structure may be from about ½ ft. to about 50 ft. per minute but it is preferred that the rate of travel be not more than about 20 ft. per minute. With some types of foams, rates of from about 1 to about 6 feet per minute through the heated rolls have been found particularly advantageous.

Inasmuch as the dense skin structure is produced on the cured polyurethane foam by means of combined pressure and heat treatment for a predetermined length of time, the foregoing preferred ranges of temperature, pressure and treatment time periods are, of course, interrelated. Therefore, the particular pressure, treatment time and temperature utilized must be coordinated with each other. For a given pressure, higher temperature may be utilized for a shorter time than would be possible with a lower temperature. Similarly, as the time of treatment may be increased, the treatment temperature and pressure may be reduced. A particular combination of conditions of treatment must also be chosen with reference to the particular composition of the foam to be consumed in forming the skin and the composition of the foam used as the basic structure.

Polyurethane foams of any suitable composition may be utilized as the material to be consumed in forming the skin and as the basic structure. By "basic structure" as used herein is meant the polyurethane foam structure that will serve as the substratum in the finished article and have the skin thereon. Inasmuch as any of the various flexible, semirigid and rigid polyurethane foams disclosed in the art may be treated in accordance with this invention or may be utilized as the skin forming element in the proccess, no detailed discussion of the chemistry involved in forming the isocyanate foams is included. However, in order to describe briefly the general type of material with which this invention is concerned, it is pointed out that the invention is suitable for forming a dense skin on any isocyanate foam structure formed by the reaction of a compound having an active hydrogen atom with a polyisocyanate or polyisothiocyanate in the presence or absence of water, the reaction leading to chain-lengthening crosslinking and evolution of a blowing gas and resulting in the formation of a cellular plastic material. Hydroxyl polyesters formed from dibasic acids and polyhydroxy alcohols, hydroxyl polyalkylene ether glycols, hydrogenation products of polymeric ketones, polyalkylene thioether glycols, and the like, are examples of compounds having an active hydrogen which are suitable for reacting with an aliphatic or aromatic polyisocyanate. However, as pointed out above, any suitable isocyanate foam may be utilized for the basic structure in practicing this invention and may be utilized as the foam applied to the surface of the basic structure and from which the skin is formed. Examples of cured polyurethane foams that may be used for either component of the finished product are those made in accordance with the process set forth in detail in the copending application of Peter Hoppe et al., Serial No. 527,106, filed August 8, 1955 now Patent No. 2,764,565. Other suitable foam compositions are disclosed in U.S. Patents 2,726,219; 2,577,279; 2,577,281 and 2,642,403. Slabs of isocyanate foam or continuous webs or sheets of the isocyanate foams formed by any suitable manner, such as by means of a slitting machine or other device designed to remove the natural skin or sediment formed on the surface of a foam as it is produced, may be treated in accordance with this invention and any scrap isocyanate foam resulting from such cutting and trimming operations may be utilized for forming the dense skin.

The density or porosity of the cured polyurethane foam used as the basic structure will have some bearing on the optimum treating conditions used in forming a dense skin thereon from polyurethane foam lying in contact therewith. Generally speaking, the larger the pores, the larger the quantity of polyurethane required to form a continuous dense skin. One of the primary advantages of this process in which the skin is formed from applied polyurethane foam instead of by consuming the surface of the basic polyurethane foam structure is that it is possible to form a dense skin in this way even on polyurethane foam having very large pores on the surface thereof without any material reduction in the dimensions of the basic polyurethane structure. The dimension of the finished article may be predetermined by proper selection of the amount of foam applied for forming the skin. Although, as pointed out hereinbefore, the polyurethane foam applied to the surface of the basic structure may be of any size or shape and may, in fact, be a single sheet or film, it is usually preferred to use a granular material which has dimensions such that the pores will be filled and a substantially continuous film or skin will be formed during the treatment period with a minimum amount of smearing or movement of the applied foam with respect to the basic foam. Moreover, the granular material may be reduced to a plastic or flowable material more easily than a continuous sheet.

In order better to describe and to clarify further the invention, the following is a description of embodiments thereof.

Referring now to the accompanying drawing, FIGURE 1 is an illustration of a die suitable for applying a skin to a continuous rod of polyurethane foam. In applying the skin, a suitable rod 1 of polyurethane foam is pushed through heated die 2 having an entrance 3 of greater diameter than the diameter of the rod 1 and tapering to a point where it is of less diameter than the diameter of the rod 1. A supply of granular polyurethane foam 4 is maintained continuously adjacent the rod 1 as it enters die 2. This supply of polyurethane foam 4 may be maintained from a suitable hopper associated with die 2 or by any other suitable means. Die 2 is provided with a plurality of heating elements 5 for heating at least the granular material 4 and in some embodiments it is desirable to heat at least the surface of rod 1 as well as to heat the granular material 4. As the granular polyurethane foam reaches the state where there is plastic flow, it adheres to rod 1 and a pressure is exerted because of the smaller diameter of the die which tends to consolidate the plastic polyurethane foam 4 into a dense skin that is integral with the basic material of rod 1 as it emerges from die 2. Die 2 is provided with a jacketed section near the exit end thereof through which water or other cooling medium may be flowed in order that the skin will be cooled somewhat before the rod emerges from the die. The temperature differential need not be great. A temperature of about 25° C. less than the temperature of the remainder of the die is usually sufficient. This procedure has been found to be particularly advantageous in order to produce a dense skin having optimum characteristics. Cooling in this way apparently promotes consolidation of the skin but good results can be obtained without the jacket by cooling the foam in the surrounding air as it emerges from the die.

Figure 2:
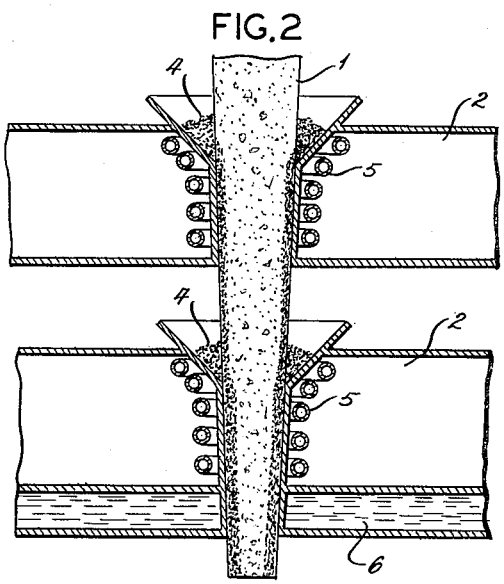
FIGURE 2 illustrates an arrangement of apparatus which may be utilized to advantage in practicing an embodiment that is a variation of the one of FIGURE 1.

The apparatus illustrated in FIGURE 2 employs a series of dies similar to that illustrated in FIGURE 1. As shown in the drawing, the dies may be of the same general construction as die 2 of FIGURE 1 although the cooling chamber 6 of die 2 will usually be eliminated from each of the dies in the series except the last one through which the rod passes. This type of apparatus is particularly advantageous because it enables accurate control of the thickness of the skin formed on rod 1 and enables the gradual build up of the skin on rod 1 by applying additional granular material to the surface of the rod at each die. Although only two dies are shown in the drawing, it is of course to be understood that any number of dies may be utilized depending upon the characteristics and thickness of the skin desired on the finished product.

Figure 3:
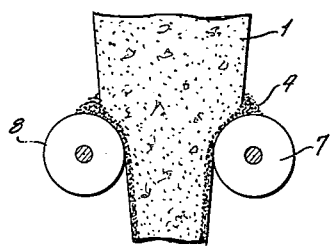
FIGURE 3 is an illustration of apparatus for practicing another embodiment of the invention in which heated rolls are utilized.

The apparatus of FIGURE 3 utilizes a pair of heated rollers adapted for forming the dense skin on a basic polyurethane structure. In an apparatus of this type, granular polyurethane foam may be fed into the nip between rod 1 and rolls 7 and 8 or a thin film may be fed between the rolls and the rod. Rolls 7 and 8 are provided with a suitable means for maintaining them at the desired temperature. The spread between the two rolls is such that rod 1 is compressed as it passes therebetween. A series of pairs of rolls may be utilized, if desired. In some instances some additional means for heating the foam may be required.

Figure 4:
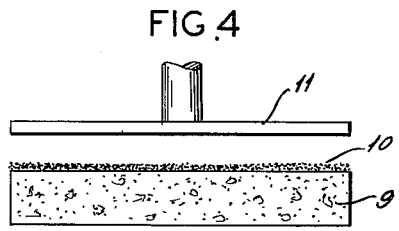
FIGURE 4 is a sectional view of apparatus suitable for use in practicing still another embodiment of the invention.

FIGURE 4 is an illustration of a method for applying a dense skin on a block of polyurethane foam. In this embodiment, particles of polyurethane foam may be sprinkled over the surface of block 9 to form a layer 10. A suitable heated platen 11 may then be pressed against the layer 10 until the particles of polyurethane foam are consolidated into a dense substantially impervious skin integral with block 9.

Figure 5:
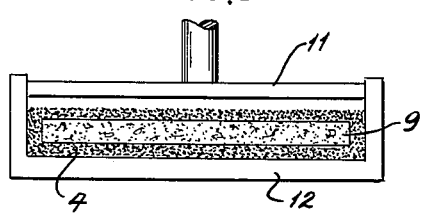
FIGURE 5 illustrates in cross section still another apparatus suitable for use in practicing an embodiment of the invention.

In the embodiment illustrated in FIGURE 5, platen 11 is associated with a suitable die 12. A block of polyurethane foam 9 is surrounded by particles of polyurethane foam and pressure is applied by means of platen 11. Die 12 and platen 11 must be heated by a suitable means to the required temperature for consolidation of the granular material into a dense substantially impervious skin on block 9.

Figure 6:
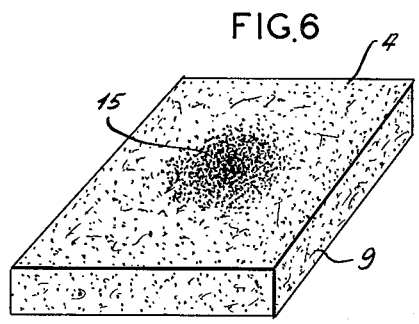
FIGURE 6 is a perspective view of one type of foam product which can be prepared by the invention.
Figure 7:
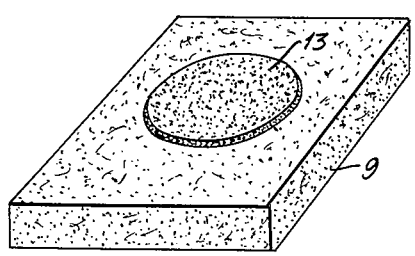
FIGURE 7 is a perspective view of another type of foam product which can be prepared by the invention.

FIGURES 6 and 7 are perspective views illustrating blocks of polyurethane foam having a surface skin 14 having different characteristics in different areas of the surface prepared in accordance with the process of this invention. As pointed out hereinbefore, such a block is possible with the process of this invention whereas it is not when the surface of a block of one composition is consumed to form the skin. The block of polyurethane foam 9 of FIGURE 6 is provided with a coating in which that portion at the center thereof is of a different chemical composition from that surounding it. The block 9 of FIGURE 7 shows a raised portion 13 which may be of a different composition or have some other characteristic different from that of the area therearound. This type of structure may be formed with a platen having a hollowed out portion adapted to form the embossment 13. The skin 14 is of course substantially nonporous, the shading in the drawing being used only for contrast.

The many advantageous characteristics of polyurethane foam having a surface skin formed by combined heating and pressure are set forth in detail in my copending application referred to hereinbefore, so a detailed presentation of data substantiating such advantages, for example, improved tensile strength, abrasion resistance, et cetera, are not included here. However, the product of the process of this invention has the same advantages as that of the process described in my earlier application and the instant process has the additional advantages of providing a means for utilizing otherwise scrap polyurethane foam and of enabling the production of polyurethane foam structures having a dense skin with a greater degree of accuracy in control of the dimensions of the finished product.

The dense skin may of course be formed with apparatus other than that shown in the drawing which was illustrated solely for the purpose of clarifying the invention. Likewise, a skin may be formed on a basic polyurethane foam structure of any shape by properly designing the rolls, dies or other apparatus used and the use of rod in the foregoing was only for convenience. A basic structure formed by laminating a plurality of sheets or slabs together may be surfaced in this way, if desired. For example, a continuous web of polyurethane foam may be provided with a dense skin by passing the web continuously under a suitable hopper or other means for sprinkling a layer of granular polyurethane foam or for laying a film or sheet of polyurethane foam thereon and thereafter passing the coated web through a suitable heating and pressing means such as an oven or bank of infrared lights associated with a suitable pressing means such as, for example, a pair of rollers or the like. Such a method is particularly well adapted for making carpet underlay and similar relatively large and thin rectangular or similar shaped structures. Other apparatus for pressing and heating the foam include a hot knife applicator, a hand roller coater and the like.

Although the invention has been described in considerable detail for the purpose of illustration, it is to be understood that the invention is not limited to such detail and that those skilled in the art may make variations therein without departing from the spirit of the invention except as set forth in the claims.

What is claimed is:

1. A method of surfacing rods, slabs and the like of polyurethane foam comprising simultaneously pressing and heating a stratum of polyurethane foam while it is in contact with the first said foam to a temperature below the decomposition temperature of polyurethane until the stratum is fused into a skin on the first said foam.

2. A method of providing a sealed cured polyurethane foam having a dense skin on at least one surface thereof comprising fusing particles of polyurethane foam to a surface of the first said foam and consolidating the fused mass into a substantially continuous skin.

3. The method of claim 2 wherein said particles are shreds of polyurethane foam.

4. In a method of surfacing a cured polyurethane foam by heating and pressing, the improvement comprising fusing a stratum of polyurethane foam to the first said foam by heating the stratum to a temperature where at least some viscous flow of the stratum occurs but below the temperature where detrimental decomposition occurs.

5. A method of surfacing a cured polyurethane foam with a dense skin comprising fusing a stratum of polyurethane foam to the first said foam by heating the stratum to a temperature where at least some of said stratum will flow but at a temperature less than the temperature where any substantial decomposition will occur and simultaneously applying pressure to densify at least the stratum.

6. A method of surfacing a sealed cured polyurethane foam with a dense skin on at least one surface thereof which comprises applying polyurethane foam to at least a portion of one surface of the first said foam, pressing and substantially simultaneously heating to a temperature where at least some plastic flow will occur but below the temperature where any appreciable decomposition of the polyurethane will occur, until the applied foam becomes a skin on the surface of the first said foam.

7. A method of surfacing a sealed cured polyurethane foam with a dense skin which comprises applying polyurethane foam to at least a portion of at least one surface of the first said foam, subjecting the applied foam to elevated temperatures and pressures, the conditions of temperature and time of treatment being adjusted to avoid any appreciable decomposition of the polyurethane but being sufficiently drastic to cause at least plastic flow of substantially all of the applied foam.

8. The process of claim 7 wherein said applied foam comprises particles of polyurethane foam.

9. A method of surfacing a sealed cured polyurethane foam with a dense heterogeneous composition comprising fusing polyurethane foam of at least two different characteristics to the surface of the first said foam.

10. A method of surfacing polyurethane foam with a dense skin comprising applying particles of polyurethane foam to at least a portion of at least one surface of the first said foam, heating at least the particles of foam to a temperature where there is some plastic flow but below the temperature where there is any substantial decomposition of the polyurethane, and smearing the heated particles over the surface of the first said foam.

11. In a method of surfacing polyurethane foam, the improvement which comprises placing scrap polyurethane foam on the first said foam, heating the scrap and at least the surface of the first said foam until the scrap has at least softened and pressing the softened scrap until it is consolidated into a skin on the first said foam.

12. In a method of surfacing a slab of polyurethane foam, the improvement which comprises coating the foam with particles of polyurethane foam and heating and pressing the particles against the surface of the said slab until the particles have consolidated and adhered to the surface of the slab while avoiding any substantial decomposition of the foam.

13. A method of providing polyurethane foam slabs, rods and the like with a substantially nonporous surface which comprises simultaneously heating a stratum of polyurethane foam to a temperature of from about 120° C. to about 1000° C. and pressing it against said slabs, rods and the like under a pressure of from about 10 to about 200 pounds per square inch until the stratum fuses and becomes consolidated into an adherent skin on the surface of the slab.

14. A method for providing a polyurethane foam rod with a substantially nonporous surface which comprises moving the rod through a heated die having cross-sectional dimensions less than the cross-sectional dimensions of the rod while simultaneously feeding polyurethane foam particles into the dye and about the rod, thereby fusing the particles into a dense skin over the surface of the rod while avoiding temperatures above the decomposition temperature of the polyurethane.

References Cited in the file of this patent

UNITED STATES PATENTS

| | | |
|---|---|---|
| 2,325,668 | Dreyfus | Aug. 3, 1943 |
| 2,357,513 | Harmon | Sept. 5, 1944 |
| 2,376,653 | Boyer | May 22, 1945 |
| 2,504,208 | Locke et al. | Apr. 18, 1950 |
| 2,526,311 | Wilson | Oct. 17, 1950 |

(Other references on following page)

UNITED STATES PATENTS

| | | |
|---|---|---|
| 2,582,228 | Brinkema | Jan. 15, 1952 |
| 2,642,920 | Simon et al. | June 23, 1953 |
| 2,716,778 | Beare | Sept. 6, 1955 |
| 2,728,698 | Rudner | Dec. 27, 1955 |
| 2,867,222 | Otto et al. | Jan. 6, 1959 |
| 2,878,153 | Hacklander | Mar. 17, 1959 |

FOREIGN PATENTS

| | | |
|---|---|---|
| 944,285 | Germany | June 14, 1956 |
| 575,125 | Great Britain | Feb. 5, 1946 |
| 589,759 | Great Britain | June 30, 1947 |

OTHER REFERENCES

"Modern Plastics," Polyurethane, November 1954, pp. 106–8; 214–16.

Dupont booklet, Urethane Resilient Foams Made From Polyesters, Elastomer Chemicals Dept. HR–10, Feb. 15, 1956, page 4.